United States Patent [19]

Schoenleben

[11] Patent Number: 4,846,610
[45] Date of Patent: Jul. 11, 1989

[54] FREIGHT SECURING DEVICE AND METHOD

[76] Inventor: Thomas J. Schoenleben, 105 Sherburn Rd., Severna Park, Md. 21146

[21] Appl. No.: 552,836

[22] Filed: Nov. 17, 1983

[51] Int. Cl.⁴ .................. B61D 45/00; B65D 67/00
[52] U.S. Cl. .......................... 410/96; 410/100; 410/31; 410/34
[58] Field of Search .................. 410/96-103, 410/106, 108, 115, 116, 31, 32, 34, 36, 42, 47, 50; 220/1.5, 445

[56] References Cited

U.S. PATENT DOCUMENTS

| | | | |
|---|---|---|---|
| 2,067,763 | 1/1937 | Holan | 410/97 C |
| 2,269,286 | 1/1942 | Ott | |
| 3,178,790 | 4/1965 | Cech | 410/116 |
| 3,897,919 | 8/1975 | Weingarten | |
| 4,264,251 | 4/1981 | Blatt | 410/100 |
| 4,428,099 | 1/1984 | Richmond | 410/103 X |
| 4,452,147 | 6/1984 | Jwuc | 410/56 X |

FOREIGN PATENT DOCUMENTS 2839305 3/1980 Fed. Rep. of Germany ........ 410/97

OTHER PUBLICATIONS

*Handbook of Adhesives,* (pp 237-241), Irving Skeist, 2nd ed. (1977) Van Nostrand, NY.
*Engineering Uses of Rubber,* (pp 69, 113, 433), McPherson, Klemn (1956), Guinn Co., Inc.

Primary Examiner—Robert B. Reeves
Assistant Examiner—Dean J. Kramer
Attorney, Agent, or Firm—Foley & Lardner, Schwartz, Jeffery, Schwaab, Mack, Blumenthal & Evans

[57] ABSTRACT

A freight securing device for freight enclosures having sheet metal sidewalls supported by spaced vertical wall stiffeners and lined with plywood panels comprising a synthetic fiber strap one end of which is attached to a ring member or equivalent connecting device and the other end of which is adhesively secured to the plywood liner with a flexible adhesive having an elasticity substantially corresponding to the elasticity of the strap so that forces applied to the anchoring member as a result of longitudinal shocks encountered by the freight enclosure and freight will be spread substantially evenly across the entire adhesive area. The strap is adhesively secured to the leading edge of a plywood panel so that the entire panel will be placed in tension and the fasteners which secure the panel to the rest of the enclosure sidewall will be substantially evenly loaded.

37 Claims, 2 Drawing Sheets

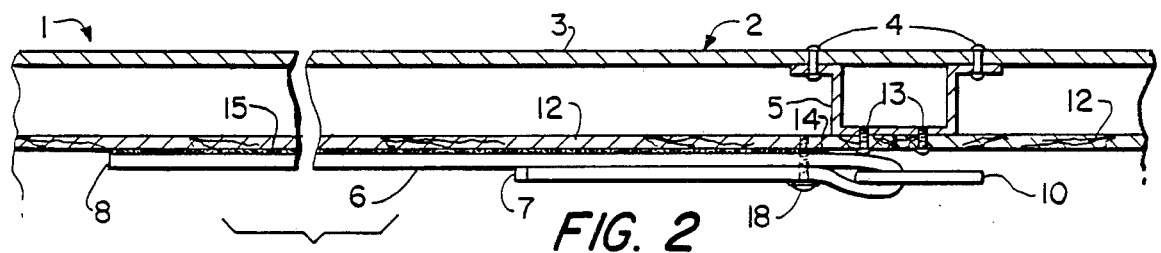
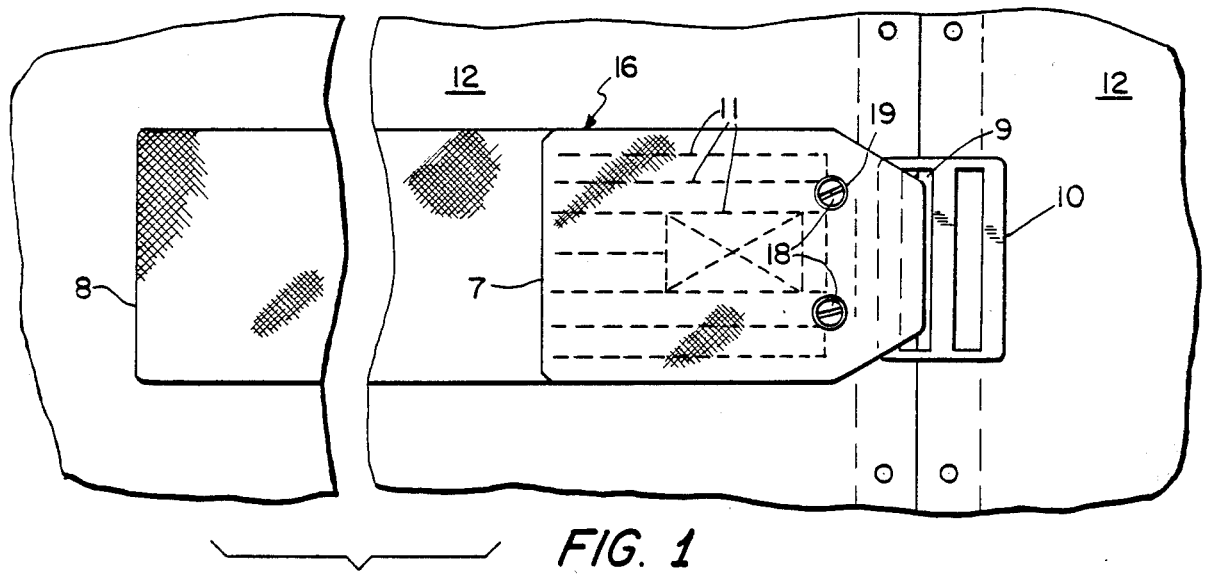
FIG. 2
FIG. 1
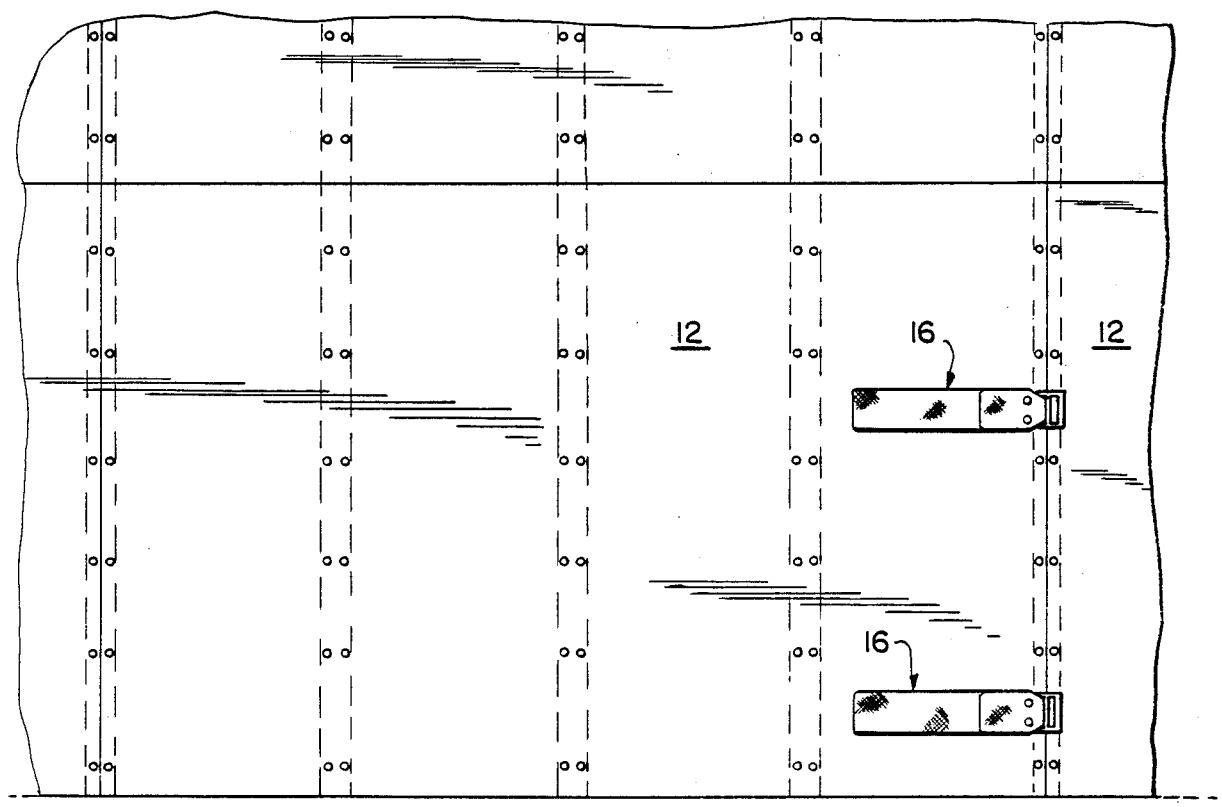
FIG. 3

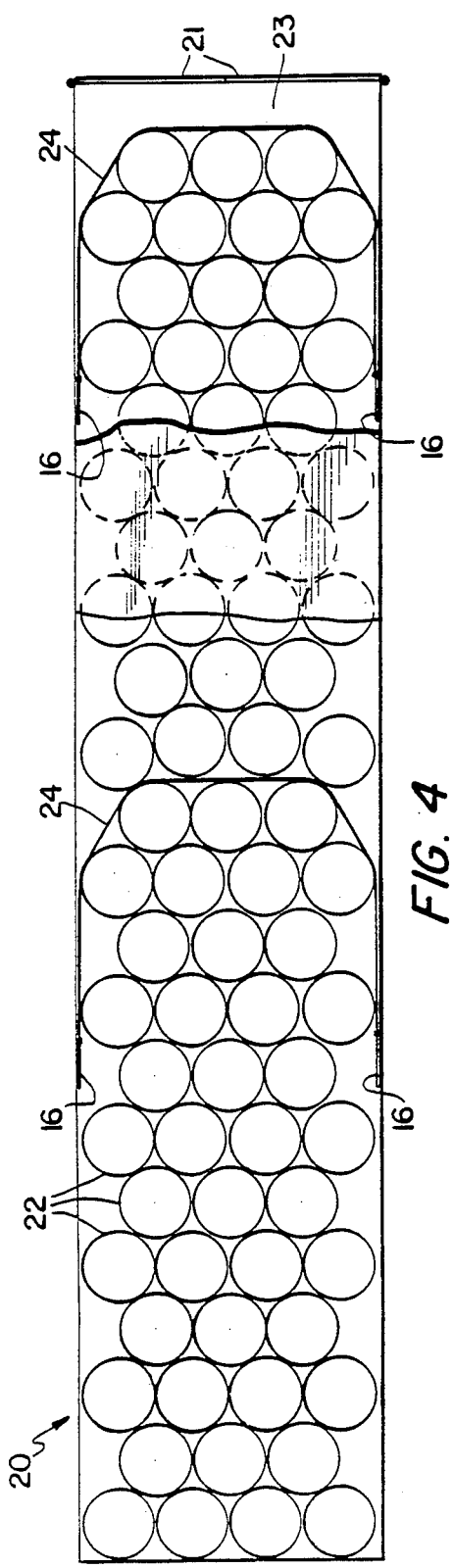
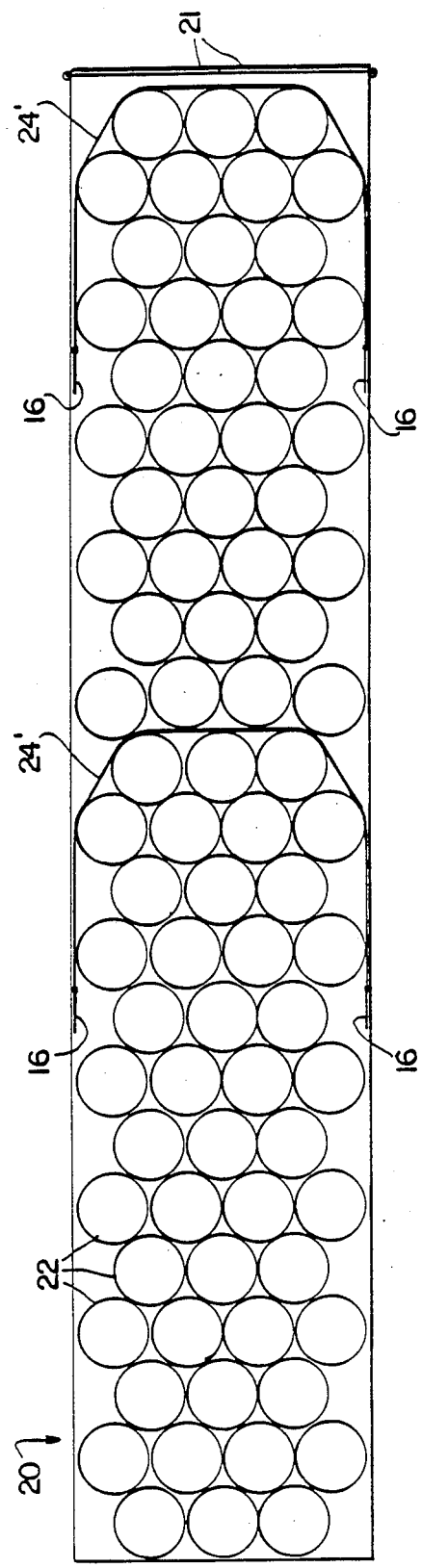

FREIGHT SECURING DEVICE AND METHOD

BACKGROUND OF THE INVENTION

The presently claimed invention relates to a permanent freight securing device to which numerous types of freight securing brace systems may be attached for use in freight enclosures such as highway trailers or intermodal freight containers.

Trailer on flat car (TOFC) and container on flat car (COFC) are high volume and expanding modes of transportation. In such systems, highway tractor trailers and their lading are delivered to a railroad trailer facility where they are placed on specially equipped flat cars and shipped via rail to their destination. Alternately, enclosed containers may be off loaded from highway trailers or ships and placed on flat cars for shipment by rail.

During rail shipment the trailers or containers and the freight loaded therein are subjected to conditions quite different from those encountered in highway movement. The most significant difference is the increased number of longitudinal shocks due to switching of rail cars and/or to slack action within the train. The longitudinal shock forces may shift the lading within the trailer or container causing a significant safety hazard and may result in damage to the trailer or container itself as well as to the freight loaded therein. In particular, damage tends to occur to the end doors of the trailer or container which take the brunt of the forces.

Section II, paragraph 5A of the Association of American Railroads (AAR) Circular 43-A entitled "Rules Governing the Loading, Blocking and Bracing of Freight In Closed Trailers and Containers for TOFC-COFC Service" specifically states that "Trailer doors are not designed to fully restrain longitudinal movement of lading without resulting damage to equipment and lading. Trailer doors may not be used to restrain longitudinal movement of lading, unless specifically permitted by an AAR closed trailer loading publication." Accordingly, additional internal bracing to restrain longitudinal movement of loaded freight is required in trailers or intermodal containers in most instances.

The application of such internal bracing is made difficult by the usual construction of the trailers or containers. Usually, the trailers or containers have weak sidewalls which are constructed of light sheet metal riveted or screwed to vertical wall stiffeners and lined with ¼ inch thick plywood panels in accordance with AAR specification M-931, paragraphs 5.3 and 5.4. Due to the nature of this construction, fastening internal braces to a trailer or container sidewall by means such as nailing is prohibited by AAR Circular 43-A, Section II, paragraph 5-G.

SUMMARY AND OBJECTS OF THE INVENTION

Accordingly, it is the object of the present invention to provide an improved freight securing device.

It is a further object of the present invention to provide a freight securing device adapted to effectively resist longitudinal shocks.

Another object of the present invention is to provide a freight securing device specifically adapted to freight enclosures having sheet metal sidewalls supported by spaced vertical wall stiffeners and lined with plywood panels.

A further object of the present invention is to provide a freight securing device suitable for use in highway tractor trailers or in intermodal containers.

It is also an object of the present invention to provide a freight securing device which will prevent damage to freight and to a freight enclosure resulting from longitudinal movement of the freight in the freight enclosure.

A still further object of the present invention is to provide a freight securing device which will minimize the safety hazards resulting from longitudinal movement of freight in a freight enclosure.

Yet another object of the present invention is to provide a freight securing device which will effectively disperse forces generated by longitudinal shocks over the widest possible area of the freight enclosure sidewall.

Additionally, it is an object of the present invention to provide a freight securing device which is compatible with a variety of bracing systems.

It is also an object of the present invention to provide a freight securing device which can be economically constructed and installed in a freight enclosure.

These and other objects of the invention are achieved by providing in a freight enclosure having a sheet metal sidewall supported by spaced vertical wall stiffeners and lined with plywood panels secured to said wall stiffeners by fastening means, a freight securement device comprising at least one pair of anchoring members disposed on opposite sidewalls of said enclosure, each anchoring member comprising a length of synthetic fiber strap one end of which is attached to a ring member and the other end of which is adhesively secured over substantially its entire surface to one of said plywood panels with a flexible adhesive having an elasticity when set substantially corresponding to the elasticity of the strap, said securement device further comprising brace means connectable between the ring members of said anchoring members, whereby tensile forces applied in the longitudinal direction to said anchoring members as a result of longitudinal shocks encountered by the enclosure and loaded freight will be spread substantially evenly across the entire adhesively secured area.

In a particularly preferred embodiment of the invention, the adhesively secured end of the strap is attached adjacent the leading edge of the plywood panel whereby the plywood panel is placed in tension by forces resulting from longitudinal shocks and the fastening means which secure the plywood panel are all substantially evenly loaded.

In further preferred aspects of the invention the synthetic fiber strap comprises a four inch wide, one-eighth inch thick polyester strap, the ring member comprises a double-eyed steel securing ring, and the adhesive comprises a flexible, one part moisture curing polyurethane adhesive.

In another aspect of the invention, the objects are achieved by providing a method of securing freight in a freight enclosure having a sheet metal sidewall supported by spaced, vertical wall stiffeners and lined with plywood panels secured to said wall stiffeners by fastening means, said method comprising providing at least one pair of anchoring members on opposite sidewalls of said enclosure, each anchoring member comprising a length of synthetic fiber strap one end of which is attached to a ring member and the other end of which is adhesively secured over substantially its entire surface to one of said plywood panels with a flexible adhesive having an elasticity when set substantially corresponding to the elasticity of the strap, and connecting brace means in tight contact with said freight between the ring members of each pair of anchoring members, whereby tensile forces applied in the longitudinal direction to each anchoring member as a result of longitudinal shocks encountered by said freight enclosure and loaded freight will be spread substantially evenly across the entire adhesively secured surface.

Applicant has discovered that because of the inherent elasticity in securing straps, attachment of the straps to freight enclosure sidewalls with rigid adhesives tends to concentrate the tensile force at the leading edge of the adhesive and that this concentration of the tensile force at one point leads either to progressive delamination of the strap from the plywood liner or to progressive delamination of the plywood itself. Applicant has further discovered that if a flexible adhesive having an elastic modulus, when set, substantially corresponding to the inherent elasticity of the strap member is used to secure the strap member to the sidewall of a freight enclosure, then longitudinal forces impinging on the anchoring member are substantially uniformly dispersed over the entire adhesively secured surface area and progressive delamination may be avoided.

Applicant has also discovered that attachment of an anchoring member in the center of a plywood lining panel causes the screws or rivets which secure the plywood to the sidewall to be unevenly loaded thereby increasing the likelihood that individual fasteners will fail and the liner will separate from the sidewall. Applicant has additionally discovered that if the anchoring member is attached to the leading edge of a plywood liner panel, application of longitudinal forces to the anchoring member as a result of longitudinal shocks encountered by the container tends to place the entire panel under tension and to substantially uniformly load the fastening means which secure the panel to the remainder of the sidewall.

As used herein the term "leading edge" refers to the edge of a panel or to the edge of an adhesively secured area which is disposed toward a freight door located in one longitudinal end of a freight enclosure.

It is not necessary that the elasticity of the adhesive be exactly the same as the elasticity of the strap member, but only that the elasticities be sufficiently close to each other to effectively disperse the tensile forces applied to the strap over substantially the entire adhesively secured area.

BRIEF DESCRIPTION OF THE DRAWINGS

The invention will be described in further detail with reference to the accompanying drawings wherein:

FIG. 1 is a side elevation of an anchoring member constructed according to the present invention;

FIG. 2 is a top plan view of the anchoring member of FIG. 1;

FIG. 3 is a partial side elevation of the sidewall of a freight enclosure showing two vertically spaced anchoring members attached thereto;

FIG. 4 is a schematic plan view of a highway tractor trailer showing a load of drums secured in position by a freight securing device according to the present invention; and FIG. 5 is a second schematic plan view of a highway tractor trailer showing a number of drums secured in position by a freight securing device according to the present invention.

DETAILED DESCRIPTION OF A PREFERRED EMBODIMENT

Turning now to the drawings, a freight enclosure generally designated by reference numeral 1 is illustrated having a sidewall 2 comprising a layer of light sheet metal 3 secured by means of rivets 4 to a series of longitudinally spaced, vertically oriented reinforcement members or stiffeners 5. As seen most clearly in FIGS. 1 and 2, a length of strap material 6 is provided having a first end 7 and a second end 8. End 7 of strap 6 is passed through one eye 9 of a ring member 10 and then folded back on itself and the overlapping portions of the strap are secured by means of stitches 11. The trailer sidewall is lined with a series of plywood panels 12 which are secured to stiffeners 5 by means of screws or rivets 13. End 8 of strap 6 is adhesively secured to plywood panel 12 adjacent the leading edge 14 thereof by means of a layer of flexible adhesive 15. The adhesively secured strap 6 and associated ring member 10 together constitute an anchoring member 16. As can be seen most clearly in FIGS. 4 and 5, anchoring members 16 are disposed in pairs opposite each other on the sidewalls of the freight enclosure.

If desired, a pair of screws 18 may be secured through strap 6 adjacent the leading edge of adhesive 15 toward ring member 10 into plywood panel 12 to assist in supporting the anchoring member during curing of the adhesive and also to provide additional protection against progressive delamination. Washers 19 may be provided adjacent the screwheads.

Typically the plywood panel will have a thickness of approximately ¼ inch, but panels of greater or lesser thickness may be utilized.

The strap member 6 is preferably formed of a synthetic fiber material such as nylon or polyester. Polyester strap material is particularly preferred since its elasticity is more readily matched by available adhesives.

In the illustrated embodiment, ring member 10 is shown as a double-eyed steel securing ring or buckle. It will be appreciated, however, that a single ring, a pair of single rings or any other equivalent connecting member could be used within the scope of the invention.

As the adhesive, any adhesive may be used which exhibits sufficient adhesion to the plywood sidewall liner and to the strap material and which has a modulus of elasticity sufficiently close to the elastic modulus of the strap material that longitudinal tensile forces applied to the strap material will be spread substantially evenly over the entire adhesively secured area. Satisfactory results may be obtained with a flexible, one part moisture curing polyurethane adhesive. A particularly suitable adhesive is sold by the 3M Company under the trademark 3M Scotch-Grip Brand 5230 wood adhesive.

The size of the adhesively secured area may vary. However, the area should be large enough to effectively disperse longitudinal tensile forces applied to the anchoring member. Desirably the adhesively secured area of each anchoring member will amount to at least 35 square inches (for example an area of approximately 36 square inches achieved by bonding a 12 inch length of 3 inch wide strap). It is particularly preferred to have the adhesively secured area amount to at least about 70 square inches (for example the 72 square inch area achieved by bonding an 18 inch length of four inch wide strap to the liner of the freight enclosure).

As can be seen most clearly in FIG. 3, anchoring members 16 are preferably attached to plywood panel 12 adjacent the leading edge 14 thereof so that substantially the entire panel is placed under tension when longitudinal forces are applied to the anchoring members. Consequently, the rivets or screws which secure the panel to the sidewall stiffeners or support posts will be substantially uniformly loaded, thereby reducing the possibility that individual fasteners will be overloaded and pulled loose.

FIG. 4 is a schematic plan view of a highway trailer 20 with doors 21 at one longitudinal end thereof. Trailer 20 is loaded with seventy-seven drums 22 of standard 55 gallon size. Drums 22 are arranged with a row of four at the nose of the trailer and thereafter in alternate rows of three and four. A free area designated by reference numeral 23 is left between the last row of drums and the doors 21. Drums 22 must be restrained against longitudinal movement in order to prevent shifting of the load and possible damage to doors 21. This is achieved according to the invention by providing trailer 20 with two longitudinally spaced pairs of oppositely disposed anchoring members 16 adhesively secured to the plywood liner of trailer 20 with a flexible adhesive having an elasticity substantially corresponding to the elasticity of the anchoring member straps. A nylon restraining strap 24 is connected between each pair of anchoring members 16 in tight contact with the drums 22. To assure that tensile forces applied to anchoring members 16 as a result of longitudinal shocks encountered by trailer 20 are applied primarily in a longitudinal direction, the brace member or restraining strap 24 is first extended towards the trailer doors 21 a distance approximately equal to the width of trailer 20 and from thence across the width of the trailer and back to the other anchoring member of the pair.

FIG. 5 depicts a highway trailer loading arrangement substantially similar to that illustrated in FIG. 4 except a total of eighty drums 22 are loaded on the trailer beginning with a row of three at the closed end thereof, and steel restraining straps 24' are connected between each pair of anchoring members 16.

The importance of using a flexible adhesive having an elasticity substantially corresponding to the elasticity of the anchoring member straps to secure the anchoring members to the trailer liner is illustrated by the following tests:

TEST 1

Various lengths of polyester and nylon straps were adhesively secured to plywood samples and the strength of the resulting assemblies were laboratory tested on a Baldwin tension and compression machine with a platen speed of ½ inch per minute. Each test strap had a width of 1¾ inches. Results of the test are set forth in the following table:

TABLE I

| Adhesive | Strap | Length (inches) | Strength (pounds) | Pounds/ Sq. In. |
|---|---|---|---|---|
| Scotch Grip 847 | Nylon | 12 | 1225 | 58.3 |
|  | Nylon | 18 | 1180 | 37.5 |
|  | Polyester | 18 | 1915 | 60.8 |
| Scotch Grip 5200 | Nylon | 12 | 1495 | 71.2 |
| (1 part moisture curing polyurethane) | Polyester | 18 | 3225 | 102.4 |
| Scotch Grip 4314 | Nylon | 18 | 910 | 28.9 |
| (synthetic rubber base) | Polyester | 12 | 2435 | 115.9 |

TABLE I-continued

| Adhesive | Strap | Length (inches) | Strength (pounds) | Pounds/ Sq. In. |
|---|---|---|---|---|
| Scotch Grip 5230 | Nylon | 18 | 2100 | 100.0 |
| (1 part moisture curing polyurethane) | Polyester | 18 | 3850 | 122.2 |
| 3M Jet Melt 3758 | Nylon | 18 | 1800 | 57.1 |
| (solvent-free thermoplastic resin) | Polyester | 18 | 4200 | 133.3 |

The results clearly show that bond strength is related to the relative elasticities of the straps and the adhesives.

TEST 2

Two 40 foot highway trailers with sheet metal sidewalls supported by spaced vertical wall stiffeners and lined with ¼ inch thick plywood panels riveted to the wall stiffeners were equipped with two longitudinally spaced pairs of oppositely disposed wall anchors made of 26 inch lengths of 1¾ inch wide undyed polyester straps. An 18 inch length of each anchor member strap was adhesively secured to the leading edge of a plywood liner panel with a solvent-free thermoplastic resin adhesive sold by the 3M Corporation under the trademark 3M-Jet Melt 3758. Both trailers were loaded with 55 gallon drums filled with water; seventy-seven such drums were secured in the first trailer with a bracing system consisting of nylon straps attached between the anchor member pairs as illustrated in FIG. 4. The other trailer contained eighty drums and used steel straps for the brace members as illustrated in FIG. 5. Both trailers were placed on a standard draft gear flat car for testing. The flat car with the trailers was then coupled or impacted into a string of empty coal cars at speeds beginning at 2 miles per hour to determine if the wall anchors would successfully restrain the trailer lading. Impacts were conducted at 2.2, 4.1, 5.2 and 6.4 miles per hour where the anchors failed. Examination revealed that the adhesive was too rigid thereby causing the plywood wall lining to delaminate progressively from the leading edge.

TEST 3

The procedure of Test 2 was repeated except a more flexible one part moisture curing polyurethane adhesive sold by the 3M Company under the trademark Scotch Grip 5230 was used to secure the anchoring member straps to the plywood liner of the trailer. The width of the anchoring member straps was also increased to four inches. In the test, the freight securing devices according to the invention demonstrated an ability to successfully retain the loads through longitudinal shocks resulting from impacts at speeds as high as 8.2 miles per hour. Further tests conducted under the auspices of the AAR Bureau of Explosives and the AAR Damage Prevention Department demonstrated the ability of the wall anchors to withstand impacts of 4, 6 and 8 miles per hour toward the trailer doors and a reverse impact of 8 miles per hour. Laboratory stress tests of the wall anchor members indicated an individual load capacity of 5,600 pounds, each.

The foregoing description has been set forth merely to illustrate the invention and its advantages, and it is not intended that the invention be limited just to the described embodiments. Since modifications of the described embodiments incorporating the spirit and substance of the invention may occur to persons skilled in the art, the scope of the invention is to be limited solely with respect to the appended claims and equivalents.

What is claimed is:

1. In a freight enclosure having a sheet metal sidewall supported by spaced vertical wall stiffeners and lined with panels secured to said wall stiffeners by fastening means, a freight securement device comprising at least one pair of anchoring members disposed on opposite sidewalls of said enclosure, each anchoring member comprising a length of synthetic fiber strap one end of which is attached to a ring member and the other end of which is adhesively secured over substantially its entire surface to one of said panels with a flexible adhesive having an elasticity when set, substantially corresponding to the elasticity of said strap, said securement device further comprising brace means connectable between the ring members of said anchoring members 2. A freight securement device as recited in claim 1 wherein each anchoring member is adhesively secured adjacent the leading edge of said one panel so that said one panel will be placed in tension by tensile forces applied to the anchoring member.

3. A freight securement device according to claim 1 further comprising at least one screw fastened through said strap and into said panel adjacent the leading edge of said adhesive.

4. A freight securement device according to claim 1 wherein said adhesively secured area has a width of at least about three inches and a total area of at least about 35 square inches.

5. A freight securement device according to claim 4 wherein said strap has a width of about four inches and said adhesively secured area comprises at least about 70 square inches.

6. A freight securement device according to claim 1 wherein said strap is a polyester strap.

7. A freight securement device according to claim 6 wherein said polyester strap is one-eighth inch thick undyed polyester strap.

8. A freight securement device according to claim 1 wherein said freight enclosure is a highway trailer.

9. A freight securement device according to claim 1 wherein said freight enclosure is an intermodal freight container.

10. A freight securement device according to claim 1 wherein said brace means comprises a nylon strap.

11. A freight securement device according to claim 1 wherein said brace means comprises a steel strap.

12. A freight securement device according to claim 1 wherein said adhesive is a flexible, one part moisture curing polyurethane adhesive.

13. A freight securement device according to claim 1 wherein said ring member is a double-eyed steel securing ring.

14. A freight securement device according to claim 1 wherein said strap is secured to said ring by passing said strap one end through said ring, folding the strap back on itself and sewing the overlapping portions of the strap to each other.

15. A freight securement device according to claim 1 wherein said lining panels comprise ¼ inch thick plywood sheets.

16. A freight securement device according to claim 1 wherein said brace means extends from said anchoring member a distance approximately equal the width of the container and from thence across the width of the container and back to the other anchoring member of a pair, whereby forces applied to said anchoring members as a result of longitudinal movement of loaded freight against said brace means will be applied in the longitudinal direction.

17. A freight securement device according to claim 1 comprising at least two spaced pairs of oppositely disposed anchoring members and associated brace means.

18. A freight securement device according to claim 1 comprising at least two vertically spaced pairs of anchoring members and associated brace means.

19. A method of securing freight in a freight enclosure having a sheet metal sidewall supported by spaced vertical wall stiffeners and lined with panels secured to said wall stiffeners by fastening means, said method comprising:

providing at least one pair of anchoring members on opposite sidewalls of said enclosure, each anchoring member comprising a length of synthetic fiber strap one end of which is attached to a ring member and the other end of which is adhesively secured over substantially its entire surface to one of said panels with a flexible adhesive having an elasticity when set substantially corresponding to the elasticity of the strap, and connecting brace means in tight contact with said freight between said ring members of each pair of anchoring members.

20. A method according to claim 19 wherein each anchoring member is adhesively secured adjacent the leading edge of said one panel so that said one panel will be placed in tension by longitudinal shocks encountered by said freight enclosure and loaded freight and said fastening means will be substantially evenly loaded.

21. A method according to claim 19 wherein said freight enclosure is provided with at least one door at one longitudinal end thereof which may be damaged by unrestrained longitudinal movement of freight in said enclosure.

22. In a freight enclosure having a sheet metal sidewall supported by spaced vertical wall stiffeners and lined with panels secured to said wall stiffeners by fastening means and for use with a brace means extending between the panels, a freight securement device comprising: at least one pair of anchoring members disposed on opposite sidewalls of said enclosure, each anchoring member comprising a length of synthetic fiber strap, one end of which is attached to a ring member and the other end of which is adhesively secured over substantially its entire surface to one of said panels with a flexible adhesive having an elasticity when set, substantially corresponding to the elasticity of said strap, the brace means being connectable between the ring members of said anchoring members.

23. A freight securement device as recited in claim 22 wherein each anchoring member is adhesively secured adjacent the leading edge of said one panel so that said one panel will be placed in tension by tensile forces applied to the anchoring member.

24. A freight securement device according to claim 22 further comprising at least one screw fastened through said strap and into said panel adjacent the leading edge of said adhesive.

25. A freight securement device according to claim 22 wherein said adhesively secured area has width of at least about three inches and a total area of at least about 35 square inches.

26. A freight securement device according to claim 25 wherein said strap has a width of about four inches and said adhesively secured area comprises at least about 70 square inches.

27. A freight securement device according to claim 22 wherein said strap is a polyester strap.

28. A freight securement device according to claim 27 wherein said polyester strap is one-eighth inch thick undyed polyester strap.

29. A freight securement device according to claim 22 wherein said freight enclosure is a highway trailer.

30. A freight securement device according to claim 22 wherein said freight enclosure is an intermodal freight container.

31. A freight securement device according to claim 22 wherein said adhesive is a flexible, one part moisture curing polyurethane adhesive.

32. A freight securement device according to claim 22 wherein said ring member is a double-eyed steel securing ring.

33. A freight securement device according to claim 22 wherein said strap is secured to said ring by passing said strap member one end through said ring, folding the strap back on itself and sewing the overlapping portions of the strap to each other.

34. A freight securement device according to claim 22 wherein said panels comprise ¼ inch thick plywood sheets.

35. A freight securement device according to claim 22 wherein said brace means extends from said anchoring member a distance approximately equal the width of the container and from thence across the width of the container and back to the other anchoring member of a pair, whereby forces applied to said anchoring members as a result of longitudinal movement of loaded freight against the brace means will be applied on the longitudinal direction.

36. A freight securement device according to claim 22 comprising at least two spaced pairs of oppositely disposed anchoring members and associated brace means.

37. A freight securement device according to claim 22 comprising at least two vertically spaced pairs of anchoring members and associated brace means.

* * * * *